United States Patent
Tang et al.

(10) Patent No.: US 8,971,639 B2
(45) Date of Patent: Mar. 3, 2015

(54) SEMANTIC THEME BASED SHAPE COLLAGE REPRESENTATION FOR AN IMAGE COLLECTION

(71) Applicant: Hewlett-Packard Development Company, L.P., Houston, TX (US)

(72) Inventors: Hao Tang, Palo Alto, CA (US); Peng Wu, Palo Alto, CA (US); Daniel R. Tretter, Palo Alto, CA (US); Qian Lin, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 13/628,456

(22) Filed: Sep. 27, 2012

(65) Prior Publication Data

US 2014/0086508 A1    Mar. 27, 2014

(51) Int. Cl.
    *G06K 9/46*      (2006.01)
    *G06K 9/00*      (2006.01)

(52) U.S. Cl.
    USPC .......................................................... 382/203

(58) Field of Classification Search
    CPC .......... H04N 1/00196; H04N 1/00198; H04N 2201/3253; H04N 1/00148
    USPC ................. 382/164, 173, 218, 224–225, 284; 345/629; 348/207.1, E5.024; 455/466; 707/694

See application file for complete search history.

(56) References Cited

U.S. PATENT DOCUMENTS

| | | | |
|---|---|---|---|
| 7,035,467 B2 | 4/2006 | Nicponski | |
| 7,945,848 B2 | 5/2011 | Kasperkiewicz et al. | |
| 8,611,677 B2 * | 12/2013 | Das et al. | 382/225 |
| 2011/0157221 A1 * | 6/2011 | Ptucha et al. | 345/629 |
| 2011/0285748 A1 * | 11/2011 | Slatter et al. | 345/629 |
| 2012/0027293 A1 * | 2/2012 | Cok | 382/164 |
| 2012/0027303 A1 | 2/2012 | Cok | |
| 2012/0027311 A1 | 2/2012 | Cok | |
| 2013/0130729 A1 * | 5/2013 | Cok et al. | 455/466 |
| 2014/0086508 A1 * | 3/2014 | Tang et al. | 382/284 |

* cited by examiner

*Primary Examiner* — Amir Alavi
(74) *Attorney, Agent, or Firm* — Hewlett-Packard Patent Department

(57) ABSTRACT

Examples disclosed herein relate to creating an image collage in a semantic theme based shape. For example, a processor may determine a semantic theme associated with an image collection, select a shape associated with the semantic theme, and create a collage of at least a subset of the image collection in the selected shape. The processor may output the created collage.

13 Claims, 3 Drawing Sheets

SEMANTIC THEME BASED SHAPE COLLAGE REPRESENTATION FOR AN IMAGE COLLECTION

BACKGROUND

A collage allows many images to be viewable at once in an aesthetically pleasing manner. For example, the images may be placed adjacent and overlapping one another so that more images are displayed in a smaller area. The collage may convey an entire image collection in a single image in a manner that allows a viewer to more easily digest the image collection as a whole.

BRIEF DESCRIPTION OF THE DRAWINGS

The drawings describe example embodiments. The following detailed description references the drawings, wherein.

DETAILED DESCRIPTION

An image collage may be automatically created in a particular shape based on a detected semantic theme of the image collection. Photograph collections often have semantic themes, and a shape based collage may assemble the photographs in a manner that quickly conveys the theme to a viewer. The shape based collage may provide a viewer with context about the images without a viewer closely analyzing the individual images within the collage. Conveying information about the image collection more easily is desirable in an age of information explosion due to more easily captured and stored digital images. In one implementation, a processor automatically determines a semantic theme of an image collection, determines a shape associated with the semantic theme, and creates a collage of images within the outline of the determined shape.

Figure 1:
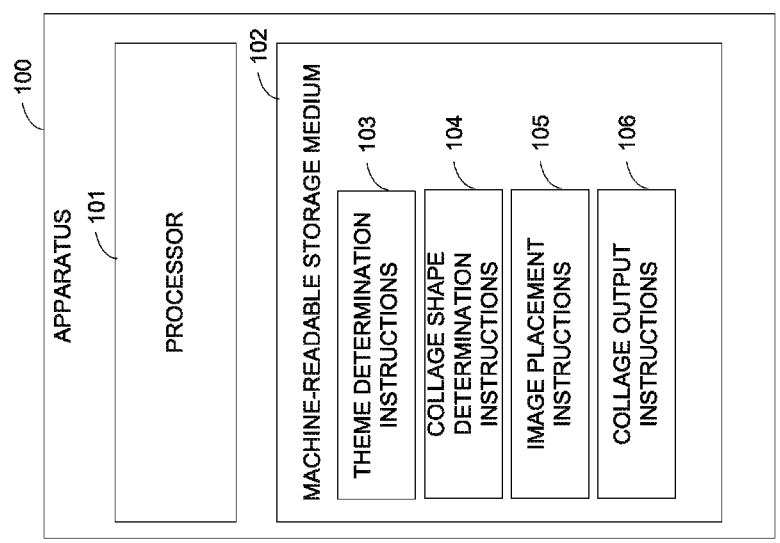
FIG. 1 is a block diagram illustrating one example of an apparatus to create a collage in a shape related to an image collection theme.

FIG. 1 is a block diagram illustrating one example of an apparatus to create a collage in a shape related to an image collection theme. A collage may be, for example, an assemblage of images into a larger image. The collage may be an arrangement of individual images adjoining or overlapping one another. The individual images may be cropped and placed next to one another to appear overlapping, or may actually overlap one another. The images may be placed on a larger background, such as an image that creates a color outline around the perimeter of the collage shape. In some cases, there may be space between images in the collage where the background is visible in that space.

The apparatus 100 may include a processor 101 and a machine-readable storage medium 102. The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors. In one implementation, the apparatus 100 operates in a cloud architecture where the functionality of the processor 101 is performed by one or more server processors communicating with a user electronic device via a network. The user electronic device may upload collage images, and the processor 101 may create a collage in a shape representing the semantic theme of the images to be sent to the user electronic device.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may include theme determination instructions 103, collage shape determination instructions 104, image placement instructions 105, and collage output instructions 106 executable by the processor 101. The theme determination instructions 103 may include instructions to determine a semantic theme of a collection of images, such as based on an analysis of image content, metadata, and image context information. The collage shape determination instructions 104 include instructions for determining a shape associated with the semantic theme. For example, a heart shape may be associated with Valentine's Day. The image placement instructions 105 include instructions for placing images within the determined collage shape. All or a subset of the images in the image collection may be selected for placement within the collage. The position of the images and the visible portions of the images may be determined based on a method to increase the prominence of more important images and more important portions of images. The collage output instructions 106 include instructions for outputting the created collage, such as by displaying, storing, or transmitting the collage. The collage may be printed on a medium, such as on paper or ceramic.

Figure 2:
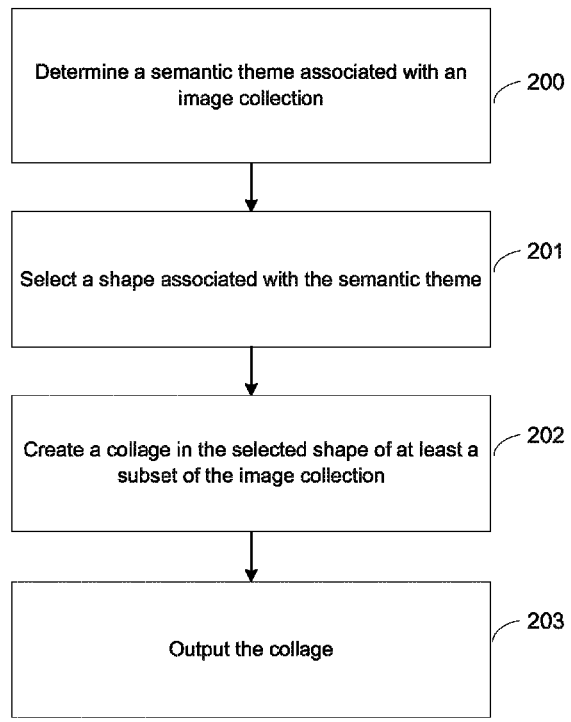
FIG. 2 is a diagram illustrating one example of a method to create a collage in a shape related to an image collection theme.

FIG. 2 is a diagram illustrating one example of a method to create a collage in a shape related to an image collection theme. In some cases, an interesting shape based collage may be automatically created for an image collection with the use of little user input. The method may be implemented, for example, by the apparatus 100 of FIG. 1.

Beginning at 200, the processor determines a semantic theme associated with an image collection. The image collection may be a collection of photographs, drawings, or other images. The image collection may contain images in any suitable digital format, such as raw images or JPEG. In some cases, the images may be images scanned to a digital format.

A user may select the image collection or a group of images to be analyzed. The processor may receive the image collection from a storage device or via a network. The image collection may be a collection organized by a user. For example, a user may organize their photographs in folders based on a semantic theme, such as vacation or holiday, and the processor may determine the theme of the image collection. In some cases, the processor receives information from a user about the semantic theme, such as based on user input providing the theme or based on user tagging of the image collection or individual images. For example, a folder may have a name indicating a particular semantic theme.

The semantic theme may be, for example, an event or topic. Example themes are holiday, party, or vacation. The semantic theme may be determined in any suitable manner. The processor may use the content of the images, metadata related to the images, or text associated with the images to determine the semantic theme. As an example, the capture date or location of an image may be used to determine the theme. For example, a capture date on a particular holiday may indicate a theme associated with the holiday and a capture location in a tourist location may indicate a vacation theme. In some cases, text, such as the title of the image or social networking comments on the image may be evaluated to determine the theme. Image analysis methods may be used to determine the content of the images, and the shape may be determined based on the image content. For example, the images may contain people or landscapes indicative of the semantic theme. As another example, an image set containing a large amount of a color or color set associated with a holiday.

In some cases, a high level semantic theme may be selected, and a more specific theme may be determined from the high level theme. For example, the high level semantic theme may be travel, and the processor may further analyze the images and possible travel related collage shapes to determine a beach semantic theme associated with a flip flop collage shape outline.

The processor may use event classification methods. For example, an event classification method may extract visual features such as oriented gradients from an input image, quantize the features into a set of visual code words, build a histogram of the quantized features (a.k.a. bag of visual code words), and compute a similarity score between the input image and a known event based on the computed bag of visual code words. The processor may classify the image collection based on its similarity to a group of themes and select the theme with the highest similarity to the image collection.

A larger image collection may be analyzed and classified into groups based on semantic themes. Multiple collages may then be created, or one of the themes may be selected for the collage. For example, a large image collection may be provided, and the processor may create four collages from the image collection, each representing a different semantic theme.

Continuing to 201, the processor selects a shape associated with the semantic theme. The shape may be any related geometric shape, such as a symbol, logo, or outline of an item. The shape may be selected based on the semantic theme, or based on the semantic theme in addition to other information about the image collection. For example, the shape may be selected based on the semantic theme in addition to the number of images to be placed in the collage or the orientation of the images to be placed in the collage. In one implementation, a set of possible collage shapes is selected based on the semantic theme, and the processor further selects a collage shape within the set based on additional factors. The collage shape may be selected from the set based on the purpose of the collage, such as whether it is for a card or a poster.

The processor may select the shape in any suitable manner. The processor may access a storage device for storing shapes associated with semantic themes. For example, the processor may access a database of information stored on the same apparatus as the processor, or the processor may access the stored information via a network. The processor may determine the associated shape to the semantic theme. In some cases, the storage stores multiple shapes associated with a semantic theme, and additional characteristics are used to select among the shapes.

In one implementation, the processor performs a search based on the semantic theme. For example, the processor may associate a keyword or set of keywords with the semantic theme. The processor may determine the semantic theme most closely related to the image collection and access stored information associating the semantic theme with keywords. The processor may then perform a search, such as a search engine Internet search, of the keywords. The processor may extract images from the search results and select one of the extracted images as the collage shape. The processor may select one of the extracted images and alter the extracted image, such as by changing an edge or other image characteristics to adapt the shape to the collage. In some cases, the processor may perform a search for a theme related keyword and store the determined collage shapes from the search to be accessed for creating future collages.

In one implementation, the processor selects an object within an image of the image collection as the collage shape. For example, the processor may select a repeating image shape in the collage. In one implementation, a storage devices stores information associating semantic themes with shape outlines. The processor may search the image collection for the shape outlines associated with the theme and select one of the shape outlines as the collage shape.

In one implementation, multiple collage shapes may be selected. For example, a silhouette shape of a player within the image set may be a portion of the collage, and a stored basketball outline may be a second shape next to the player as a second smaller collage. As another example, a silhouette of a first object in the collage images may be used as the outline for part of the shape collage, and a silhouette of a second object in the collage images may be used as the outline for the another part of the collage, such as a soccer player from the collage images as part of the outline and a soccer goal from the collage images as another part of the outline. In some cases the collage may have a shape within a shape.

Proceeding to 202, the processor creates a collage in the selected shape of at least a subset of the image collection. The processor may use any suitable method for placing the images within the collage shape. The processor may position the images in a manner that allows prominent portions of the images, such as faces, to be visible. The images may be positioned in a manner that the images are adjacent or overlapping one another. The images may be cropped so that they appear to be overlapping.

The processor may select a subset of images within the image collection to include within the collage. The subset of images may be selected based on image duplication detection. For example, the processor may determine a set of non-duplicate images to be included in the collage. The duplicate images may be detected by determining a similarity score between sets of images, and categorizing images with a similarity score above a threshold as duplicates. For example, the image collection may include multiple similar photos that are considered to be duplicate images even where the images are not exactly the same, such as where repeated images with the same pose were captured.

The collage subset may be determined based on image capture time clustering, such as where images taken around the same time are included in the same collage. In some cases, images taken around the time are determined to be similar, and fewer images of the group are selected. For example, five images may be determined to have been captured within ten seconds of one another, and one of the five images may be selected for display in the collage.

Image quality level may be used to select images from the image collection for placement in the collage. For example, the images may be assigned a quality score, and images above a quality threshold may be included in the collage. The image quality score may be based on focus, lighting, and other image characteristics. In some cases, image quality may be used in conjunction with other characteristics. For example, where duplicates are detected, the highest quality of the duplicate set may be included within the collage.

The processor may determine the collage size based on the image subset size or image content, and/or the processor may determine the image subset size based on the collage size. The processor may filter the images based on the number that may be shown in the collage, such as by setting a quality threshold according to the number that may fit in the collage.

The processor may select a background for the collage. The background may appear in spaces between photograph images in the collage or outside of the edge of the collage. For example, the images may not fill the entire collage shape, and the remaining interior or exterior of the shape may be filled with the background. The background may be, for example, a color, text, photograph, or drawing. The processor may access a storage device with information associating backgrounds to semantic themes and/or image collection characteristics. The background may be an image behind or beside the collage shape and/or within the collage itself. For example, the background in the exterior or interior of the shape may further convey the semantic theme. The background may be a different shape than the collage shape, such as where a collage shape is placed in the middle of a red square background.

The processor may select the background based on the semantic theme of the collage and/or the characteristics of the images in the collage. For example, a semantic theme may be associated with a particular background color. In some cases, the background may be based on the color or other image characteristics. In one implementation, the background is created from text of social networking comments of the image collection. Both the semantic theme and image characteristics may be considered, such as where a group of background images are selected with the semantic theme, and one of the images within the group is selected based on the particular image characteristics.

Moving to 203, the processor outputs the collage. Outputting the collage may involve displaying, storing, or transmitting the collage. The collage may be placed on any suitable medium. For example, the collage may be printed on a greeting card, poster, coffee mug, magnet, book, CD-ROM disk, or calendar. In one implementation, the collage is a digitally displayed collage. For example, the collage may be a representation of images within an electronic folder on a laptop computer, or the collage may be shown in a video.

The collage may be created in response to a user request, such as where a user requests a collage for a particular type of item. The processor may initiate the creation of the collage without user input. For example, the processor may automatically create collage icons to represent an electronic storage system.

Figure 3:
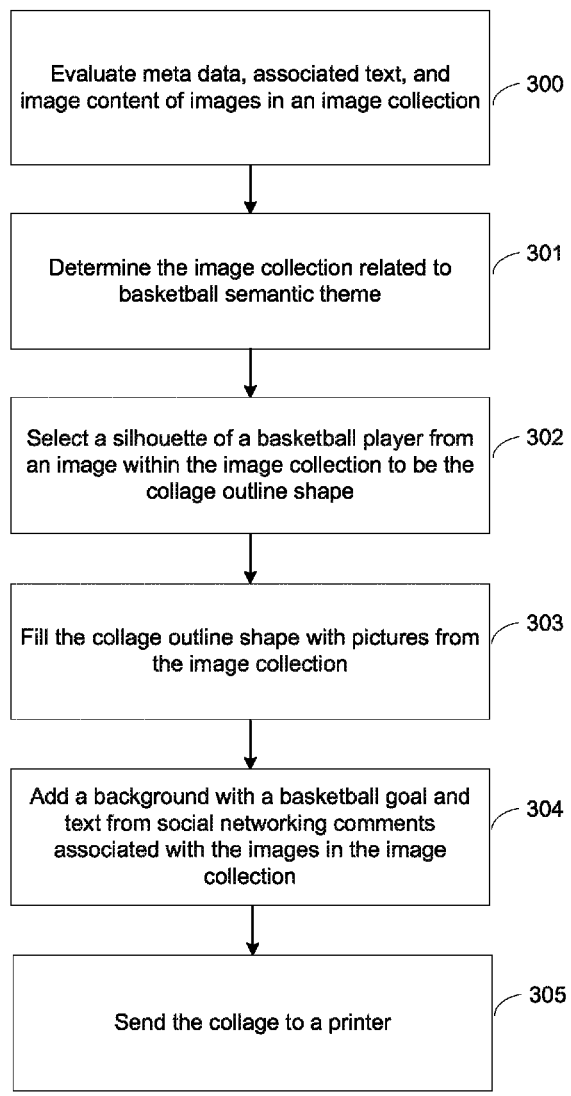
FIG. 3 is a flow chart illustrating one example of creating a collage in a shape related to an image collection theme.

FIG. 3 is a flow chart illustrating one example of creating a collage in a shape related to an image collection theme, such as by using the method of FIG. 2. Beginning at 300, a processor evaluates metadata, associated text, and image content of images in an image collection. Continuing to 301, the processor determines the image collection is related to a basketball semantic theme. For example, the location metadata of multiple images in the image collection may indicate that the pictures were taking at a sports arena, image captions or social networking comments may be related to cheering on a team, and/or sports equipment or jerseys may be identified within some of the images within the image collection.

Moving to 302, the processor selects a silhouette of a basketball player from an image within the image collection to be the collage outline. For example, the processor may access stored information indicating a player silhouette as a collage shape. The processor may use image analysis methods to identify a player silhouette shape within the image collection to be used as the collage shape.

Proceeding to 303, the processor fills the collage outline shape with pictures from the image collection. For example, the processor may determine a subset of images that are least related to one another or the subset of images of higher quality. The processor may fill the collage shape in a manner that maximizes the visible prominent areas of more images or makes more important images larger.

Moving to 304, the processor adds a background with a basketball goal and text from social networking comments associated with the images in the image collection. For example, the name of the team may he added to the bottom of the collage. As another example, a sports collage may be created within a shape of the outline of the name of the sport or the name of the team. Continuing to 305, the processor sends the collage to a printer. For example, the collage may be printed to a poster.

As another example, an image collection may be determined to have a travel semantic theme. The metadata associated with the image collection may indicate that the images are taken at a national park. A square collage may be created with a national park symbol shape in the middle. A second collage may be placed within the national park symbol outline.

As another example, an image collection may be determined to have a dance theme. The shape outline of a couple slow dancing may be selected as the collage shape outline, and a background image of text of names of types of dance or names of dance productions may be shown outside of the collage shape.

A shape based theme collage may create an interesting image arrangement. Automatically creating a collage in a particular shape allows for an aesthetically pleasing arrangement of images without extensive user effort. As digital images are more easily captured, it is desirable to have easy to use methods for compiling and displaying large numbers of images.

The invention claimed is:

1. An apparatus, comprising:
a processor to:
   determine a semantic theme associated with an image collection;
   select a shape associated with the semantic theme, wherein selecting the shape comprises at least one of: selecting a shape associated with the semantic theme from a storage, performing a search of images based on a keyword associated with the semantic theme, and selecting an outline of an object in one of the images in the image collection representative of the semantic theme;
   create a collage of at least a subset of the image collection in the selected shape; and
   output the collage.

2. The apparatus of claim 1, wherein the processor further selects a background for the collage based on at least one of: the semantic theme and characteristics of the images in the collage.

3. The apparatus of claim 1, wherein the process further selects a subset of the images to display in the collage based on at least one of: image duplicate detection, image capture time clustering, and image quality level.

4. The apparatus of claim 1, wherein determining the semantic theme comprises determining the semantic theme based on at least one of: location information associated with the images, text associated with the images, time capture information associated with the images, and objects within the images.

5. A method, comprising:
    determining a semantic theme associated with an image collection;
    selecting a shape associated with the semantic theme, wherein selecting the shape comprises at least one of: selecting a shape associated with the semantic theme from a storage, performing a search of images based on a keyword associated with the semantic theme, or selecting an outline of an object in one of the images in the image collection representative of the semantic theme;
    creating a collage in the selected shape of at least a subset of the image collection; and
    outputting the collage.

6. The method of claim 5, further comprising selecting a background for the collage associated with the semantic theme.

7. The method of claim 5, further comprising:
    grouping the image collection by theme; and
    creating a collage for at least one of the themes.

8. The method of claim 5, wherein outputting the collage comprises outputting a collage icon to provide a digital representation of a collection of images.

9. The method of claim 5, wherein determining the semantic theme comprises determining the semantic theme based on at least one of: location information associated with the images, text associated with the images, time capture information associated with the images, and objects displayed within the images.

10. A machine-readable non-transitory storage medium comprising instructions executable by a processor to:
    determine a semantic theme representative of an image collection;
    determine a collage outline shape representative of the semantic theme, wherein determining the collage outline shape comprises at least one of: selecting a shape associated with the semantic theme from a storage, performing a search of images based on a keyword associated with the semantic theme, and selecting an outline of an object in one of the images in the image collection representative of the semantic theme;
    place at least a subset of the images in the image collection within a collage in the determined collage outline shape; and
    output the collage.

11. The machine-readable non-transitory storage medium of claim 10, wherein instructions to determine the semantic theme comprise instructions to determine the semantic theme based on at least one of: metadata associated with the images within the image collection and image content of images within the image collection.

12. The machine-readable non-transitory storage medium of claim 10, further comprising instructions to cluster the images within the image collection based on semantic theme.

13. The machine-readable non-transitory storage medium of claim 10, wherein determining the semantic theme comprises determining the semantic theme based on at least one of: location information associated with the images, text associated with the images, time capture information associated with the images, and objects displayed within the images.

* * * * *